United States Patent
Koshinaka

(10) Patent No.: US 8,751,227 B2
(45) Date of Patent: Jun. 10, 2014

(54) ACOUSTIC MODEL LEARNING DEVICE AND SPEECH RECOGNITION DEVICE

(75) Inventor: Takafumi Koshinaka, Tokyo (JP)

(73) Assignee: NEC Corporation, Tokyo (JP)

(*) Notice: Subject to any disclaimer, the term of this patent is extended or adjusted under 35 U.S.C. 154(b) by 431 days.

(21) Appl. No.: 12/921,062

(22) PCT Filed: Feb. 10, 2009

(86) PCT No.: PCT/JP2009/052193
§ 371 (c)(1),
(2), (4) Date: Sep. 3, 2010

(87) PCT Pub. No.: WO2009/133719
PCT Pub. Date: Nov. 5, 2009

(65) Prior Publication Data
US 2011/0046952 A1   Feb. 24, 2011

(30) Foreign Application Priority Data
Apr. 30, 2008   (JP) .................................. 2008-118662

(51) Int. Cl.
*G10L 15/00*   (2013.01)

(52) U.S. Cl.
USPC .......................................... 704/233; 704/231

(58) Field of Classification Search
USPC ................................................ 704/231–246
See application file for complete search history.

(56) References Cited

U.S. PATENT DOCUMENTS

| | | | |
|---|---|---|---|
| 6,134,524 A * | 10/2000 | Peters et al. | 704/233 |
| 6,173,258 B1 * | 1/2001 | Menendez-Pidal et al. | 704/233 |
| 6,230,122 B1 * | 5/2001 | Wu et al. | 704/226 |
| 6,233,556 B1 * | 5/2001 | Teunen et al. | 704/250 |
| 6,671,666 B1 * | 12/2003 | Ponting et al. | 704/233 |
| 6,766,295 B1 * | 7/2004 | Murveit et al. | 704/243 |
| 6,778,957 B2 * | 8/2004 | Wang et al. | 704/233 |
| 6,826,528 B1 * | 11/2004 | Wu et al. | 704/226 |
| 6,915,259 B2 * | 7/2005 | Rigazio et al. | 704/244 |
| 6,934,364 B1 * | 8/2005 | Ho | 379/21 |
| 6,980,952 B1 * | 12/2005 | Gong | 704/234 |
| 7,451,085 B2 * | 11/2008 | Rose et al. | 704/244 |
| 2003/0050780 A1 * | 3/2003 | Rigazio et al. | 704/246 |
| 2006/0009972 A1 * | 1/2006 | Yuk et al. | 704/234 |

FOREIGN PATENT DOCUMENTS

| | | |
|---|---|---|
| JP | 6-175678 A | 6/1994 |
| JP | 2002091485 A | 3/2002 |
| JP | 2003-099082 A | 4/2003 |

OTHER PUBLICATIONS

International Search Report for PCT/JP2009/052193 mailed May 19, 2009.
D. A. Reynolds, "Channel Robust Speaker Verification via Feature Mapping", Proc. ICASSP2003, vol. II, 2003, pp. 53-56.

(Continued)

*Primary Examiner* — Douglas Godbold

(57) ABSTRACT

Parameters of a first variation model, a second variation model and an environment-independent acoustic model are estimated in such a way that an integrated degree of fitness obtained by integrating a degree of fitness of the first variation model to the sample speech data, a degree of fitness of the second variation model to the sample speech data, and a degree of fitness of the environment-independent acoustic model to the sample speech data becomes the maximum. Therefore, when constructing an acoustic model by using sample speech data affected by a plurality of acoustic environments; the effect on a speech which is caused by each of the acoustic environments can be extracted with high accuracy.

20 Claims, 9 Drawing Sheets

(56) References Cited

OTHER PUBLICATIONS

D. Zhu et al., "A generalized feature transformation approach for channel robust speaker verification", Proc. ICASSP2007, vol. IV, 2007, pp. 61-64.

T. Anastasakos et al., "A Compact Model for Speaker-Adaptive Training," Proc. ICSLP96, 1996.

Y. Yamaguchi et al., "Acoustic Model Adaptation by Taylor Series", IEICE Technical Report, vol. 96, No. 422, Dec. 13, 1996, pp. 1-8.

Y. Akita et al.,"Generalized Statistical Modeling of Pronunciation Variations for Spontaneous Speech Recognition", The Transactions of the Institute of Electronics, Information and Communication Engineers D-II, vol. J88-D-II, No. 9, Sep. 1, 2005, pp. 1780-1789.

\* cited by examiner

| SAMPLE DATA | FIRST ACOUSTIC ENVIRONMENT LABEL A | SECOND ACOUSTIC ENVIRONMENT LABEL B |
|---|---|---|
| 1 | A2 | B3 |
| 2 | A1 | B2 |
| 3 | A2 | B4 |
| ⋮ | ⋮ | ⋮ |

| SPEAKER \ CHANNEL | MICROPHONE | FIXED PHONE | MOBILE PHONE |
|---|---|---|---|
| FEMALE | ○ | ○ | ○ |
| SENIOR | ○ | ○ | ○ |
| MALE | ○ | ○ | ○ |

| SPEAKER \ CHANNEL | MICROPHONE | FIXED PHONE | MOBILE PHONE |
|---|---|---|---|
| FEMALE | — | ○ | ○ |
| SENIOR | ○ | ○ | — |
| MALE | — | — | ○ |

Fig. 12

ACOUSTIC MODEL LEARNING DEVICE AND SPEECH RECOGNITION DEVICE

This application is the National Phase of PCT/JP2009/052193, filed Feb. 10, 2009, which is based upon and claims the benefit of priority from Japanese patent application No. 2008-118662 filed on Apr. 30, 2008, the disclosure of which is incorporated herein in its entirety by reference.

TECHNICAL FIELD

The present invention relates to a learning technique for constituting an acoustic model.

BACKGROUND ART

Speech recognition technology is used in a wide variety of applications such as information input, information retrieval, speech input support, video indexing, speaker recognition, personal identification by speech, tone measurement and environment measurement. In order to enhance the accuracy of speech recognition, an attempt has been made to reduce the effect of a variation factor caused by a transmission channel, noise or the like by learning an acoustic model.

FIG. 10 shows a schematic example of an acoustic model learning device that implements the acoustic model learning technique disclosed in Non-Patent Document 1 and Non-Patent Document 2. As shown therein, an acoustic model learning device 1 includes a speech data storing means 11, a channel label storing means 12, a speaker independent model learning means 13, a channel model learning means 14, a speaker independent model storing means 15, and a channel model storing means 16.

The speech data storing means 11 stores sample speech data which is acquired through various transmission channels. The transmission channels mean the varieties of physical devices which a speech from a speech source such as a speaker has passed through until the speech is recorded, and among examples are a fixed phone (including a fixed phone terminal and a fixed communication line), a mobile phone (including a mobile phone terminal and a mobile communication line), a vocal microphone and so on. Hereinafter, the transmission channel is also referred to simply as a channel.

Further, even if the content of a speech is the same, the speech as data is different depending on whether a speaker is female or male. Likewise, even with the same speech content and the same speaker, the speech as data is different depending on which of a fixed phone or a mobile phone the speech is recorded through. A speech source, a transmission channel or the like which has a plurality of different types, the different types causing a variation to occur in the speech, is called an acoustic environment.

The channel label storing means 12 of the acoustic model learning device 1 stores label data which corresponds to sample speech data stored in the speech data storing means 11 and indicates a channel which the sample speech data has passed through.

The speaker independent model teaming means 13 receives the sample speech data and the label data from the speech data storing means 11 and the channel label storing means 12, respectively, removes a variation component that is dependant on the acoustic environment of a channel from the sample speech data and extracts only a variation component that is dependant on the acoustic environment of a speaker, thereby learning a speaker independent acoustic model. In the following description, the "speaker independent acoustic model" is also referred to as a "speaker independent model".

The channel model learning means 14 receives the sample speech data and the label data from the speech data storing means 11 and the channel label storing means 12, respectively, and, with respect to each channel, learns an affine transformation parameter which corresponds to an acoustic model of the channel. Specifically, the channel acoustic model can be calculated, based on the assumption that it can be obtained by performing affine transformation of a speaker independent model, by learning its parameter. In the following description, the "channel acoustic model" is also referred to as a "channel model".

Note that the speaker independent model learning means 13 and the channel model learning means 14 perform the iterative method described in Non-Patent Document 3 in cooperation with each other, update the speaker independent acoustic model and the affine transformation parameter (channel acoustic model) and, after the iterative method converges, output the definite speaker independent acoustic model and affine transformation parameter.

The speaker independent model storing means 15 receives and stores the speaker independent model from the speaker independent model learning means 13, and the channel model storing means 16 receives and stores the channel model from the channel model learning means 14.

According to the acoustic model learning device 1, with respect to each channel, the affine transformation parameter specific to each channel can be acquired. Therefore, it is considered that, by applying the affine transformed acoustic model to the speech data input from any known channel or executing inverse affine transformation on the speech data, it is possible to reduce a variation factor due to a channel and correctly recognize a recognition target.

[Non-Patent Document 1]
D. A. Reynolds, "Channel robust speaker verification via feature mapping," Proc. ICASSP2003, Vol. II, pp. 53-56, 2003

[Non-Patent Document 2]
D. Zhu et al., "A generalized feature transformation approach for channel robust speaker verification," Proc. ICASSP2007, Vol. IV, pp. 61-64, 2007

[Non-Patent Document 3]
T. Anastasakos et al., "A compact model for speaker-adaptive training," Proc. ICSLP96, 1996

DISCLOSURE OF INVENTION

Technical Problem

In the acoustic model learning device 1 shown in FIG. 10, the channel model learning means 14 is based on the assumption that the speaker independent model learning means 13 can ignore a variation component caused by the acoustic environment of a speaker in order to accurately estimate an affine transformation parameter with respect to each channel; however, the assumption is not always valid.

For example, in the case of exemplary sample data as shown in FIG. 11, speech data through all channels are acquired for all types of speakers. In this case, because the speech data that have been uttered by the same type of speaker through all channels are available, even when it is unknown which speaker has uttered the speech, it is possible to know how the content of the speech changes by a change in channel. The same is true in the case of comparing a set of speech data collected for each channel among channels.

However, sample data that can be collected is generally not as perfect as shown in FIG. 11. Referring to the example of sample data shown in FIG. 12, the case where a speaker who has not uttered any speech in some channel exists is considered. In the example shown in FIG. 12, although there is speech data which is uttered by a speaker who is "female" through two channels of "fixed phone" and "mobile phone", there is no speech data through a "microphone" channel. Further, although there is speech data which is uttered by a speaker who is "senior" through two channels of "microphone" and "fixed phone", there is no speech data through a "mobile phone" channel. Further, there is only speech data which is uttered by a speaker who is "male" through a "mobile phone" channel, and there is no speech data through two channels of "microphone" and "fixed phone".

In such a case, for a speaker who is "female", for example, although it is possible to know how the speech is different between the "fixed phone" channel and the "mobile phone" channel, it is impossible to know how the speech sounds through the "microphone" channel.

The same is true in a set of speech data collected for each channel. For example, in the example of FIG. 12, the set of speech data for the "microphone" channel is composed only of the speech data of "senior" and includes the feature of a senior's speech. On the other hand, because the speech data of "senior" does not exist in the set of speech data for the "mobile phone" channel, it does not include the feature of a senior's speech. In such a situation, a variation factor due to a difference in channel and a variation factor due to a difference in the type of speaker are mixed, and it is thus difficult to figure out a variation factor due to a difference in channel.

Such a situation occurs commonly unless sample data is collected by carefully designing and executing a collection method. On the other hand, carefully designing and executing a collection method takes enormous costs for planning and acquiring test subjects, which is not practical.

The present invention is accomplished in view of the above circumstances and provides a technique to learn an acoustic model with high accuracy even with imperfect sample data and thereby enable speech recognition with high accuracy.

Technical Solution

One aspect of the present invention is an acoustic model learning device. The acoustic model learning device includes a first variation model learning unit, a second variation model learning unit, and an environment-independent acoustic model learning unit.

Using sample speech data acquired through a first acoustic environment of any one type among a plurality of types, a difference in the types causing a variation in a speech, and a second acoustic environment of any one type among a plurality of types, a difference in the types causing a variation in a speech, with respect to each type of the first acoustic environment, the first variation model learning unit estimates a parameter defining a first variation model indicating a variation occurring in a speech caused by the first acoustic environment of the each type.

Using the plurality of sample speech data, with respect to each type of the second acoustic environment, the second variation model learning unit estimates a parameter defining a second variation model indicating a variation occurring in a speech caused by the second acoustic environment of the each type.

Using the plurality of sample speech data, the environment-independent acoustic model learning unit estimates a parameter defining an acoustic model (environment-independent acoustic model) that is not specified as any type of the first acoustic environment and the second acoustic environment.

Those three learning units estimate the respective parameters in such a way that an integrated degree of fitness obtained by integrating a degree of fitness of the first variation model to the sample speech data, a degree of fitness of the second variation model to the sample speech data, and a degree of fitness of the environment-independent acoustic model to the sample speech data becomes the maximum.

Another aspect of the present invention is a speech recognition device. The speech recognition device includes a speech transformation unit that performs, on speech data as a recognition target acquired through the first acoustic environment of a given type, inverse transform of the variation indicated by the first variation model corresponding to the given type among first variation models obtained by the acoustic model learning device according to the above aspect of the present invention, and performs speech recognition on speech data obtained by the speech transformation unit.

Another aspect of the present invention is also a speech recognition device. The speech recognition device includes a speech transformation unit that performs, on speech data as a recognition target acquired through the second acoustic environment of a given type, inverse transform of the variation indicated by the second variation model corresponding to the given type among second variation models obtained by the acoustic model learning device according to the above aspect of the present invention, and performs speech recognition on speech data obtained by the speech transformation unit.

Another aspect of the present invention is an acoustic environment recognition device. The acoustic environment recognition device includes a second speech transformation unit, a first speech transformation unit, and an identification unit.

The second speech transformation unit performs, on speech data as a recognition target acquired through the second acoustic environment of a given type, inverse transform of the variation indicated by the second variation model corresponding to the given type among second variation models obtained by the acoustic model learning device according to the above aspect of the present invention.

The first speech transformation unit sequentially performs, on speech data obtained by the second speech transformation unit, inverse transform of the variation indicated by each of first variation models obtained by the acoustic model learning device according to the above aspect of the present invention and obtains a plurality of speech data.

The identification unit identifies a type of the first acoustic environment through which the speech data as a recognition target has passed by using the plurality of speech data obtained by the first speech transformation unit and the environment-independent acoustic model obtained by the acoustic model learning device according to the above aspect of the present invention.

Note that the implementation of the device according to each of the above aspects as a method, a system, or a program causing a computer to operate as the device is also effective as an aspect of the present invention.

Advantageous Effects

According to the technique of the present invention, it is possible to learn an acoustic model with high accuracy even with imperfect sample data, and it is thereby possible to enhance the accuracy of speech recognition.

BRIEF DESCRIPTION OF DRAWINGS

FIG. 12 is a view showing an example of sample speech data (second example).

Figures 1, 2:
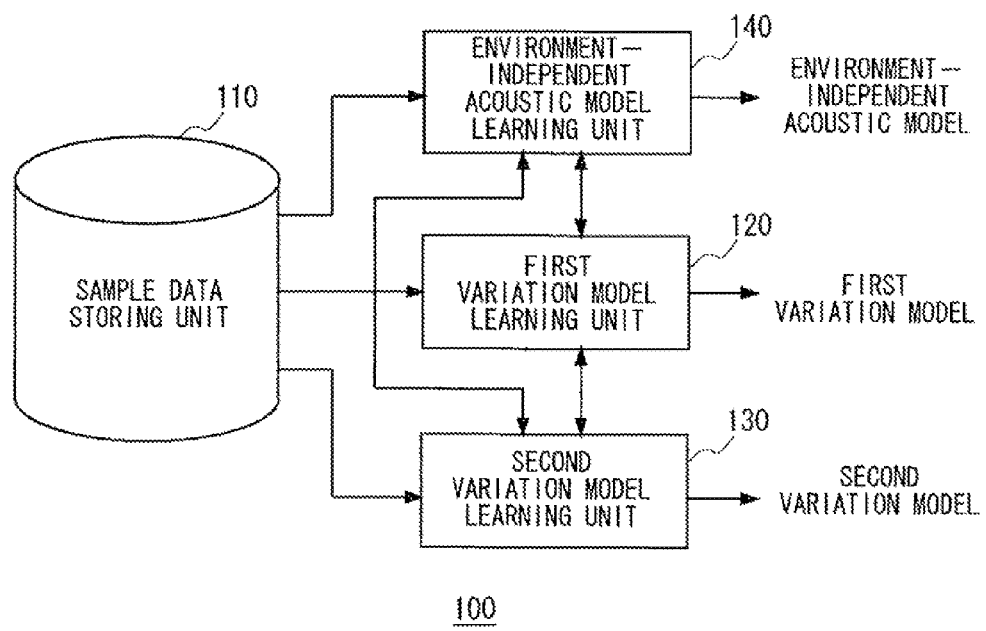
FIG. 1 is a schematic view of an acoustic model learning device to explain a technique according to the present invention.
FIG. 2 is a view showing an exemplary structure of data stored in a sample data storage unit of the acoustic model learning device in FIG. 1.

| Explanation of Reference | |
|---|---|
| 1 | ACOUSTIC MODEL LEARNING DEVICE |
| 11 | SPEECH DATA STORING MEANS |
| 12 | CHANNEL LABEL STORING MEANS |
| 13 | SPEAKER INDEPENDENT MODEL LEARNING MEANS |
| 14 | CHANNEL MODEL LEARNING MEANS |
| 15 | SPEAKER INDEPENDENT MODEL STORING MEANS |
| 16 | CHANNEL MODEL STORING MEANS |
| 100 | ACOUSTIC MODEL LEARNING DEVICE |
| 110 | SAMPLE DATA STORING UNIT |
| 120 | FIRST VARIATION MODEL LEARNING UNIT |
| 130 | SECOND VARIATION MODEL LEARNING UNIT |
| 140 | ENVIRONMENT-INDEPENDENT ACOUSTIC MODEL LEARNING UNIT |
| 200 | ACOUSTIC MODEL LEARNING DEVICE |
| 212 | SAMPLE DATA STORING UNIT |
| 214 | SPEAKER LABEL STORING UNIT |
| 216 | CHANNEL LABEL STORING UNIT |
| 220 | SPEAKER VARIATION MODEL LEARNING UNIT |
| 230 | CHANNEL VARIATION MODEL LEARNING UNIT |
| 240 | ENVIRONMENT-INDEPENDENT ACOUSTIC MODEL LEARNING UNIT |
| 252 | SPEAKER VARIATION MODEL STORING UNIT |
| 254 | CHANNEL VARIATION MODEL STORING UNIT |
| 256 | ENVIRONMENT-INDEPENDENT ACOUSTIC MODEL STORING UNIT |
| 300 | SPEECH RECOGNITION DEVICE |
| 312 | CHANNEL INPUT UNIT |
| 314 | SPEECH INPUT UNIT |
| 324 | CHANNEL VARIATION MODEL STORING UNIT |
| 326 | ENVIRONMENT-INDEPENDENT ACOUSTIC MODEL STORING UNIT |
| 330 | SPEECH TRANSFORMATION UNIT |
| 340 | SPEECH RECOGNITION UNIT |
| 400 | SPEECH RECOGNITION DEVICE |
| 412 | CHANNEL INPUT UNIT |
| 414 | SPEECH INPUT UNIT |
| 422 | CHANNEL VARIATION MODEL STORING UNIT |
| 424 | SPEAKER VARIATION MODEL STORING UNIT |
| 426 | ENVIRONMENT-INDEPENDENT ACOUSTIC MODEL STORING UNIT |
| 430 | SECOND SPEECH TRANSFORMATION UNIT |
| 440 | FIRST SPEECH TRANSFORMATION UNIT |
| 450 | SPEAKER IDENTIFICATION UNIT |

BEST MODE FOR CARRYING OUT THE INVENTION

Elements that are shown as functional blocks for performing various types of processing in the drawings may be configured by a processor, memory or another circuit as hardware or may be implemented by a program recorded or loaded to memory or the like as software. It would be thus obvious to those skilled in the art that those functional blocks may be implemented in various forms such as hardware only, software only or a combination of those, and not limited to either one. Further, only the elements necessary to explain the technique of the present invention are shown for easier understanding.

Before describing specific embodiments of the present invention, the principle underlying the present invention is described hereinafter.

FIG. 1 is an example of a schematic view of an acoustic model learning device 100 based on the technique according to the present invention. The acoustic model learning device 100 includes a sample data storage unit 110, a first variation model learning unit 120, a second variation model learning unit 130, and an environment-independent acoustic model learning unit 140.

The sample data storage unit 110 stores various sample speech data (which is hereinafter referred to simply as sample data), and the type of a first acoustic environment and the type of a second acoustic environment respectively in which the sample data is acquired in association with one another. The first acoustic environment has a plurality of types, and a speech varies by a difference in type. The second acoustic environment also has a plurality of types, and a speech varies by a difference in type.

FIG. 2 shows an example of data stored in the sample data storage unit 110. As shown therein, in the sample data storage unit 110, sample data, a first acoustic environment label A that indicates in which first acoustic environment the sample data is acquired, and a second acoustic environment label B that indicates in which second acoustic environment the sample data is acquired are stored in association with one another. The respective first acoustic environment labels correspond to a plurality of types of the first acoustic environment, and the respective second acoustic environment labels correspond to a plurality of types of the second acoustic environment.

For example, in the case where the first acoustic environment and the second acoustic environment are "speaker" and "channel", respectively, sample data 1 is speech data of a speaker A2 that is acquired through a channel B3, and sample data 2 is speech data of a speaker A1 that is acquired through a channel B2.

The first variation model learning unit 120 estimates, with respect to each type of the first acoustic environment, parameters that define a first variation model indicating a variation which the first acoustic environment of the relevant type causes on a speech. When the first acoustic environment is a speaker, for example, each first variation model is a variation model of a speaker.

The second variation model learning unit 130 estimates, with respect to each type of the second acoustic environment, parameters that define a second variation model indicating a variation which the second acoustic environment of the relevant type causes on a speech. When the second acoustic environment is a channel, for example, each second variation model is a variation model of a channel.

The environment-independent acoustic model learning unit 140 learns an acoustic model that does not depend on any of the first acoustic environment and the second acoustic environment. Such an acoustic model is referred to as an environment-independent acoustic model.

The environment-independent acoustic model learning unit 140 is described firstly.

The environment-independent acoustic model learning unit 140 initializes an environment-independent acoustic model, reads each sample data and the two types of acoustic environment labels that are stored in the sample data storage unit 110, and updates parameters of the environment-independent acoustic model. As the environment-independent acoustic model, known Gaussian mixture model (GMM), hidden Markov model (HMM) or the like may be used. Although GMM is taken as an example in the following description, the same operation can be derived also in the case of using another model.

In GMM, when the number of mixtures is M, parameters that define a model can be represented by the following Expression (1).

[Expression 1]

$$\{C_k, \mu_k, \Sigma_k | k=1,2,\ldots M\} \quad (1)$$

In Expression (1), $\mu_K$ and $\Sigma_K$ are the average and the variance of the k-th Gaussian distribution, respectively, and $C_K$ is a mixing coefficient (weighting factor) on the k-th Gaussian distribution.

The initialization of such parameters is performed by setting an adequate value to each parameter. For example, assuming that speech data is given in the form of a time series of feature vectors, "1/M" is set to $C_K$, and the average and the variance of the feature vectors are set to $\mu_K$ and $\Sigma_K$, respectively. Hereinafter, the parameter that defines a model is referred to as a model parameter.

By using mel-frequency cepstrum coefficients (MFCC) as the feature vectors, speech data with the i-th first acoustic environment and the j-th second acoustic environment can be represented by a time series of feature vectors as shown in the following Expression (2).

[Expression 2]

$$X_{i,j}=(x_{i,j,1}, x_{i,j,2}, \ldots, x_{i,j,T_{i,j}}) \quad (2)$$

In the above expression, $T_{i,j}$ is the number of frames of feature vectors.

Next, the first variation model learning unit 120 that learns the first variation model is described.

The first variation model learning unit 120 initializes each first variation model, reads the sample data and the acoustic environment label A stored in the sample data storage unit 110 and updates model parameters. As the model parameters of the first variation model, a set of affine transformation parameters $\{V_i, \lambda_i | i=1, 2, \ldots, N\}$ (N: the number of types of the first acoustic environment) shown in the following Expression (3) may be used, for example.

[Expression 3]

$$x \leftarrow V_i x + \lambda_i \quad (3)$$

The initialization of the first variation model is performed by setting an adequate value to each parameter. For example, "$V_i=1, \lambda_i=0$" (I: unit matrix) may be set so that affine transformation becomes identity transformation.

The second variation model learning unit 130 that learns the second variation model initializes a second variation model, reads the sample data and the acoustic environment label B stored in the sample data storage unit 110 and updates model parameters. As the model parameters of the second variation model, a set of affine transformation parameters $\{W_j, v_j | j=1, 2, \ldots, C\}$ (C: the number of types of the second acoustic environment) shown in the following Expression (4) may be used, for example.

[Expression 4]

$$X \leftarrow W_j x + v_j \quad (4)$$

The initialization of the second variation model is performed by setting an adequate value to each parameter. For example, like the initialization of the first variation model, "$W_j=1, v_j=0$" (I: unit matrix) may be set so that affine transformation becomes identity transformation.

The first variation model learning unit 120, the second variation model learning unit 130 and the environment-independent acoustic model learning unit 140 estimate the respective parameters in such a way that the integrated degree of fitness that is obtained by integrating the degree of fitness of the first variation model to sample speech data, the degree of fitness of the second variation model to sample speech data, and the degree of fitness of the environment-independent acoustic model to sample speech data becomes the maximum.

As the integrated degree of fitness, a probability that sample speech data is observed, which is represented by the parameters of those three models, may be used, for example. The probability is described hereinafter by referring to a generative process of sample speech data.

Figure 3:
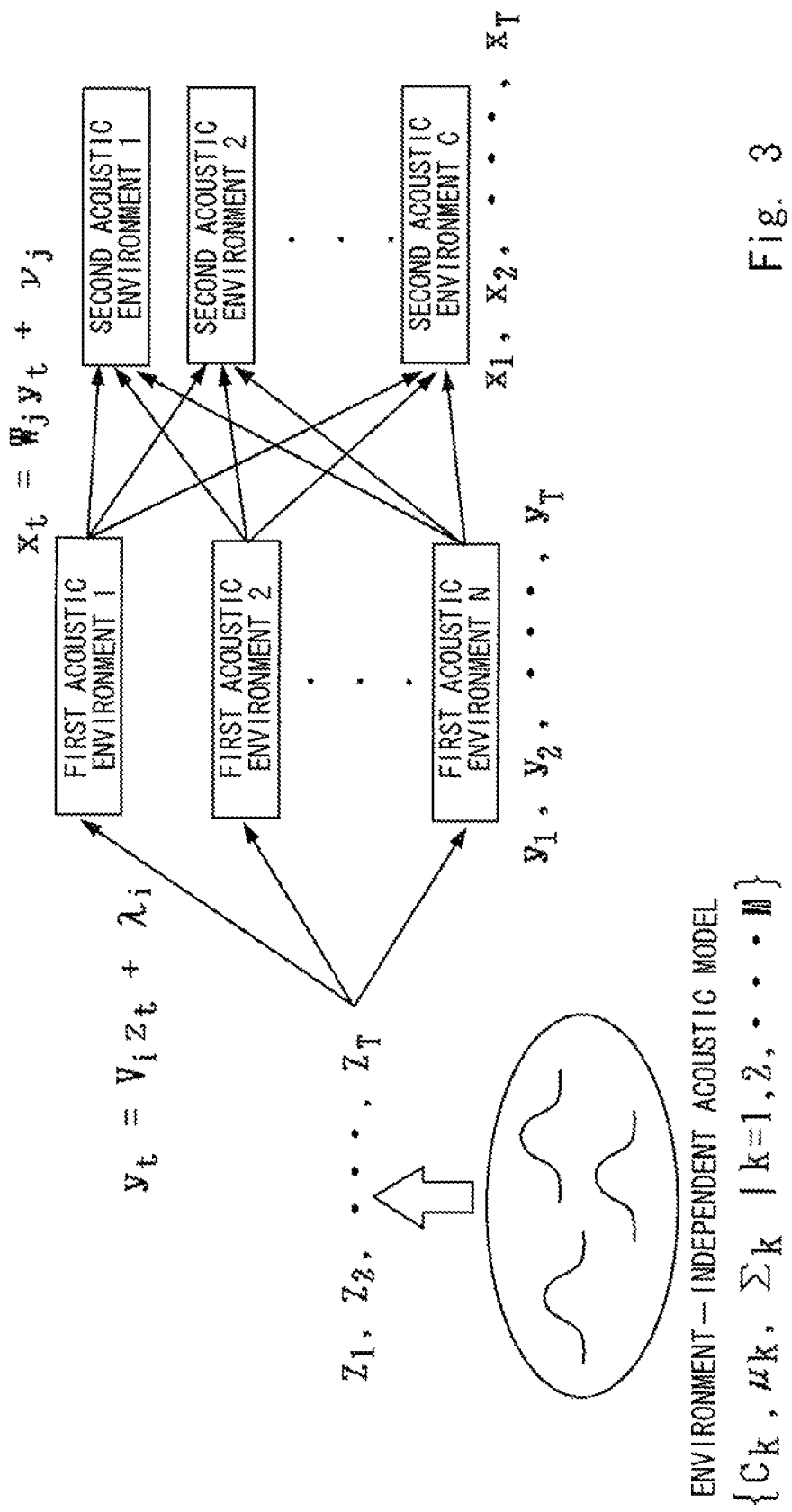
FIG. 3 is a conceptual diagram of a model that represents a generative process of speech data.

FIG. 3 is a conceptual diagram of a generative model of sample speech data which represents the event where speech data in which a variation has occurred as a result of passing through two acoustic environments in the sequence of the first acoustic environment and the second acoustic environment is observed. First, a speech before the occurrence of a variation is generated as a feature vector sequence like "$z_1, z_2, \ldots, z_T$" according to the probability distribution of an environment-independent acoustic model. The speech passes through the first acoustic environment of the type i ($1 \leq i \leq N$) and is thereby transformed as shown in Expression (5) into a speech "$y_1, y_2, \ldots, y_T$" which is different from the original speech.

[Expression 5]

$$y_t = V_i z_t + \lambda_i \quad (5)$$

After passing through the first acoustic environment, the speech further passes through the second acoustic environment of the type j ($1 \leq j \leq C$) and is thereby transformed as shown in Expression (6) into a speech "$x_1, x_2, \ldots, x_T$".

[Expression 6]

$$x_t = W_j y_t + v_j \quad (6)$$

Generally, a speech that can be observed is the speech "$x_1, x_2, \ldots, x_T$", and "$z_1, z_2, \ldots, z_T$" and "$y_1, y_2, \ldots, y_T$" are not observable.

In the case of the generative model shown in FIG. 3, the probability that a given speech data $X=(x_1, x_2, \ldots, x_T)$ is observed can be represented by the following Expression (7).

[Expression 7]

$$p(X|\theta) = \prod_{t=1}^{T} \sum_{k=1}^{M} c_k f(x_t | W_j V_i \mu_k + W_j \lambda_i + v_j, W_j V_i \Sigma_k V_i^T W_j^T) \quad (7)$$

In Expression (7), $\theta$ indicates a parameter of the environment-independent acoustic model, the first variation model and the second variation model, which is any one of $C_K$, $\mu_K$, $\Sigma_K$, $V_i$, $\lambda_i$, $W_j$, and $v_j$. Further, $f(x|\mu,\Sigma)$ indicates Gaussian distribution of the average $\mu$ and the variance $\Sigma$.

As the first variation model, the second variation model and the environment-independent acoustic model are more conform to the sample speech data observed in a various types of the first acoustic environment i and the second acoustic environment j which are represented by Expression (2), those models are more accurate. However, because the effect of the first acoustic environment and the effect of the second acoustic environment are mixed in the sample speech data, a model parameter which is calculated to be best fit for the sample speech data for each of the models lacks in accuracy.

In light of this, the most accurate acoustic model can be estimated by using the technique of estimating the respective parameters in such a way that the integrated degree of fitness that is obtained by integrating the degree of fitness of the first variation model to sample speech data, the degree of fitness of the second variation model to sample speech data, and the degree of fitness of the environment-independent acoustic model to sample speech data becomes the maximum, which is proposed by the inventor of the present invention. As the integrated degree of fitness, the probability which is represented by Expression (7) can be used. Specifically, if the parameter θ of the first variation model, the second variation model and the environment-independent acoustic model is estimated in such a way that the probability represented by Expression (7) becomes the maximum, it is possible to obtain the most accurate acoustic model.

Therefore, in the technique according to the present invention, each learning unit updates its parameter θ according to the following Expression (8).

[Expression 8]

$$\hat{\theta} = \underset{\theta}{\operatorname{argmax}} \sum_{i,j} \log p(X_{ij} \mid \theta) \qquad (8)$$

In Expression (8), argmax indicates calculating the value of a variable (which is θ in this case) in such a way that the value of a given function is maximized. The operation shown in Expression (8) is well known as a maximum likelihood estimation method, and numerical solution by an iterative calculation algorithm which is known as an expectation maximization (EM) method may be applied.

Further, the update of the parameter θ may be performed by a well known technique such as maximum a posteriori (MAP) estimation method or a Bayes estimation method, other than the maximum likelihood estimation method.

Hereinafter, a flow of a parameter estimation process by the first variation model learning unit 120, the second variation model learning unit 130 and the environment-independent acoustic model learning unit 140 in the acoustic model learning device 100 is described hereinafter with reference to the flowchart shown in FIG. 4.

Figure 4:
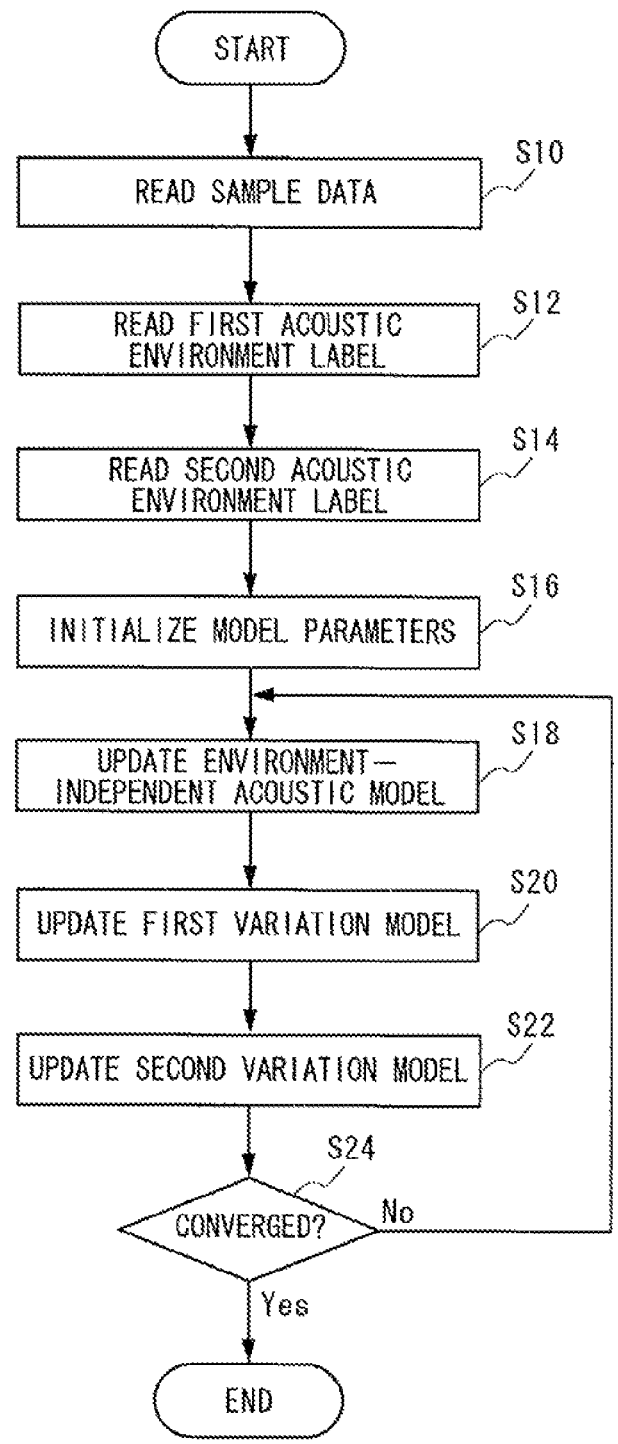
FIG. 4 is a flowchart showing a flow of a process in the acoustic model learning device shown in FIG. 1.

As shown in FIG. 4, each learning unit first reads the sample data, the first acoustic environment label and the second acoustic environment label from the sample data storage unit 110 (S10, S12, S14). The execution sequence of Steps S10, S12 and S14 is not limited thereto but may be arbitrary.

Then, each learning unit initializes the respective model parameters (S16). Specifically, the environment-independent acoustic model learning unit 140 initializes the parameters $C_K$, $\mu_K$ and $\Sigma_K$, the first variation model learning unit 120 initializes the parameters $V_i$ and $\lambda_i$, and the second variation model learning unit 130 initializes the parameters $W_j$ and $v_j$. Examples of values which are set to the respective parameters by the initialization are as described earlier, and detailed explanation is omitted here.

Note that the initialization in Step S16 may be executed before Steps S10 to S14. In this case, because sample data cannot be referred to, the environment-independent acoustic model learning unit 140 uses a technique such as initializing $\mu_K$ and $\Sigma_K$ by random numbers.

Then, the environment-independent acoustic model learning unit 140 updates the parameters $C_K$, $\mu_K$ and $\Sigma_K$ of the environment-independent acoustic model according to Expressions (9), (10) and (11) (S18).

[Expression 9]

$$c_k \leftarrow \frac{\sum_{i=1}^{N} \sum_{j=1}^{C} \sum_{t=1}^{T_{ij}} \gamma_{ijkt}}{\sum_{k=1}^{M} \sum_{i=1}^{N} \sum_{j=1}^{C} \sum_{t=1}^{T_{ij}} \gamma_{ijkt}} \qquad (9)$$

[Expression 10]

$$\mu_k \leftarrow \frac{\sum_{i=1}^{N} \sum_{j=1}^{C} \sum_{t=1}^{T_{ij}} \gamma_{ijkt} V_i^{-1}\{W_j^{-1}(x_{ijt} - v_j) - \lambda_i\}}{\sum_{k=1}^{M} \sum_{i=1}^{N} \sum_{j=1}^{C} \sum_{t=1}^{T_{ij}} \gamma_{ijkt}} \qquad (10)$$

[Expression 11]

$$\Sigma_k \leftarrow \frac{\sum_{i=1}^{N} \sum_{j=1}^{C} \sum_{t=1}^{T_{ij}} \gamma_{ijkt} [V_i^{-1}\{W_j^{-1}(x_{ijt} - v_j) - \lambda_i\}]}{\sum_{k=1}^{M} \sum_{i=1}^{N} \sum_{j=1}^{C} \sum_{t=1}^{T_{ij}} \gamma_{ijkt}} \qquad (11)$$

Note that $\gamma_{ijkt}$ in Expressions (9), (10) and (11) is calculated in advance according to Expression (12) as the probability of belonging to the k-th Gaussian distribution of the environment-independent acoustic model.

[Expression 12]

$$\gamma_{ijkt} = P(k \mid x_{ijt}, \theta) = \frac{c_k f(x_{ijt} \mid W_j V_i \mu_k + W_j \lambda_i + v_j, W_j V_i \Sigma_k V_i^T W_j^T)}{\sum_{k'=1}^{M} c_{k'} f(x_{ijt} \mid W_j V_i \mu_{k'} + W_j \lambda_i + v_j, W_j V_i \Sigma_{k'} V_i^T W_j^T)} \qquad (12)$$

The update of the parameters of the environment-independent acoustic model learning unit 140 in Step S18 may be performed once or repeated a predetermined number of times. Further, a convergence test using the logarithmic probability on the right-hand side of Expression (8) as an index, for example, may be adopted, and the update may be repeated until reaching convergence.

Then, the first variation model learning unit 120 updates the parameters $V_i$ and $\lambda_i$ of the first variation model according to Expressions (13) and (14) (S20).

[Expression 13]

$$\lambda_i \leftarrow V_i \left( \sum_{j=1}^{C} \sum_{k=1}^{M} \sum_{t=1}^{T_{ij}} \gamma_{ijkt} \Sigma_k^{-1} \right)^{-1} \sum_{j=1}^{C} \sum_{k=1}^{M} \sum_{t=1}^{T_{ij}} \gamma_{ijkt} \Sigma_k^{-1} [V_i^{-1} W_j^{-1}(x_{ijt} - v_j) - \mu_k] \quad (13)$$

[Expression 14]

$$V_i \leftarrow \frac{\sum_{k=1}^{M} \sum_{j=1}^{C} \sum_{t=1}^{T_{ij}} \gamma_{ijkt} \Sigma_k^{-1} [V_i^{-1}\{W_j^{-1}(x_{ijt} - v_j) - \lambda_i\} - \mu_k] \{W_j^{-1}(x_{ijt} - v_j) - \lambda_i\}^T}{\sum_{k=1}^{M} \sum_{j=1}^{C} \sum_{t=1}^{T_{ij}} \gamma_{ijkt}} \quad (14)$$

Note that $\gamma_{ijkt}$ in Expressions (7) and (8) is also calculated in advance according to Expression (12) as in the case of the environment-independent acoustic model learning unit 140. Further, the number of updating the parameters may be determined in the same manner as in the case of the environment-independent acoustic model learning unit 140.

Then, the second variation model learning unit 130 updates the parameters $v_j$ and $W_j$ of the second variation model according to Expressions (15) and (16) (S22).

[Expression 15]

$$v_j \leftarrow W_j \left( \sum_{i=1}^{N} \sum_{k=1}^{M} \sum_{t=1}^{T_{ij}} \gamma_{ijkt} (V_i \Sigma_k V_i^T)^{-1} \right)^{-1} \sum_{i=1}^{N} \sum_{k=1}^{M} \sum_{t=1}^{T_{ij}} \gamma_{ijkt} (\Sigma_k V_i^T)^{-1} [V_i^{-1}(W_j^{-1} x_{ijt} - \lambda_i) - \mu_k] \quad (15)$$

[Expression 16]

$$W_j \leftarrow \frac{\sum_{k=1}^{M} \sum_{i=1}^{N} \sum_{t=1}^{T_{ij}} \gamma_{ijkt} V_i \Sigma_k^{-1} [V_i^{-1}\{W_j^{-1}(x_{ijt} - v_j) - \lambda_i\} - \mu_k] (x_{ijt} - v_j)^T}{\sum_{k=1}^{M} \sum_{i=1}^{N} \sum_{t=1}^{T_{ij}} \gamma_{ijkt}} \quad (16)$$

Note that $\gamma_{ijkt}$ in Expressions (15) and (16) is also calculated in advance according to Expression (12) as in the case of the environment-independent acoustic model learning unit 140. Further, the number of updating the parameters may be determined in the same manner as in the case of the environment-independent acoustic model learning unit 140.

The update processing of Steps S18 to S22 is repeated until reaching convergence (No in S24, S18-). Note that, at the time of convergence (Yes in S24), the parameters of the first variation model, the second variation model and the environment-independent acoustic model are respectively output from the first variation model learning unit 120, the second variation model learning unit 130 and the environment-independent acoustic model learning unit 140, and the learning process by the acoustic model learning device 100 ends.

As described above, according to the technique of the present invention, the first variation model learning unit 120 can extract only a variation factor arising from the first acoustic environment, and the second variation model learning unit 130 can extract only a variation factor arising from the second acoustic environment, so that it is possible to construct accurate acoustic models even with imperfect sample data. Accordingly, it is possible to accurately perform speech recognition using those acoustic models.

On the basis of the above description, embodiments of the present invention are described hereinbelow.

First Embodiment

Figure 5:
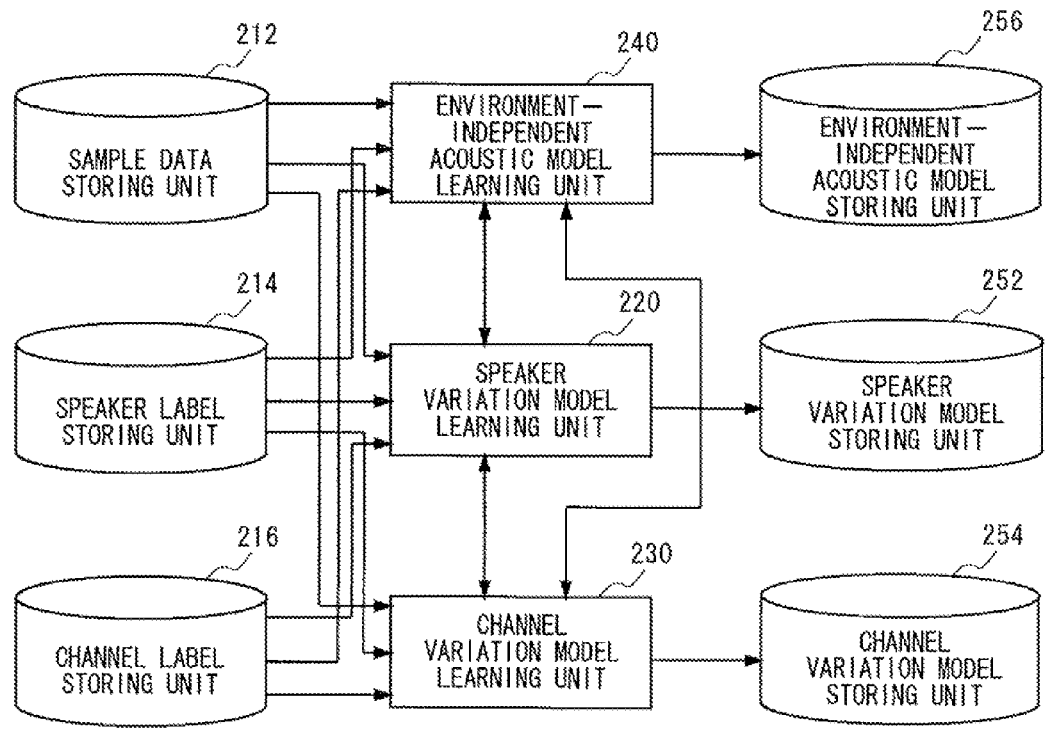
FIG. 5 is a view showing an acoustic model learning device according to a first embodiment of the invention.

FIG. 5 shows an acoustic model learning device 200 according to a first embodiment of the present invention. The acoustic model learning device 200 includes a sample data storing unit 212, a speaker label storing unit 214, a channel label storing unit 216, a speaker variation model learning unit 220, a channel variation model learning unit 230, an environment-independent acoustic model learning unit 240, a speaker variation model storing unit 252, a channel variation model storing unit 254, and an environment-independent acoustic model storing unit 256.

The sample data storing unit 212 stores sample speech data of a plurality of speakers which are recorded through various channels.

The speaker label storing unit 214 stores data of a label indicating each speaker (speaker label) of each of the sample data stored in the sample data storing unit 212.

The channel label storing unit 216 stores data of a label indicating each channel (channel label) of each of the sample data stored in the sample data storing unit 212.

The sample data storing unit 212, the speaker label storing unit 214 and the channel label storing unit 216 store the sample data, the speaker label and the channel label in association with one another.

The speaker variation model learning unit 220 is equivalent to the first variation model learning unit 120 of the acoustic model learning device 100 shown in FIG. 1. A speaker is the first acoustic environment, and the speaker variation model learning unit 220 obtains a first variation model with respect to each speaker. The first variation model is referred to hereinafter as a speaker variation model.

The channel variation model learning unit 230 is equivalent to the second variation model learning unit 130 of the acoustic model learning device 100. A channel is the second acoustic environment, and the channel variation model learning unit 230 obtains a second variation model with respect to each channel. The second variation model is referred to hereinafter as a channel variation model.

The environment-independent acoustic model learning unit 240 is equivalent to the environment-independent acoustic model learning unit 140 of the acoustic model learning device 100, and learns an environment-independent acoustic model which does not depend on any of a speaker and a channel.

The three learning units estimate the respective parameters in such a way that the integrated degree of fitness that is obtained by integrating the degree of fitness of the speaker variation model to sample speech data, the degree of fitness of the channel variation model to sample speech data, and the degree of fitness of the environment-independent acoustic model to sample speech data becomes the maximum. Specific processing of each learning unit is the same as that of the equivalent learning unit in the acoustic model learning device 100, and detailed explanation thereof is omitted.

The speaker variation model storing unit 252, the channel variation model storing unit 254 and the environment-independent acoustic model storing unit 256 store the speaker variation model, the channel variation model and the environment-independent acoustic model which are obtained by the speaker variation model learning unit 220, the channel variation model learning unit 230 and the environment-independent acoustic model learning unit 240, respectively.

The acoustic model learning device 200 according to the embodiment is a concretization of the principle underlying the present invention and offers the same advantage as that of the acoustic model learning device 100.

Examples of uses of the acoustic model which is obtained by the acoustic model learning technique according to the present invention are described hereinafter by using a second embodiment and a third embodiment.

Second Embodiment

Figure 6:
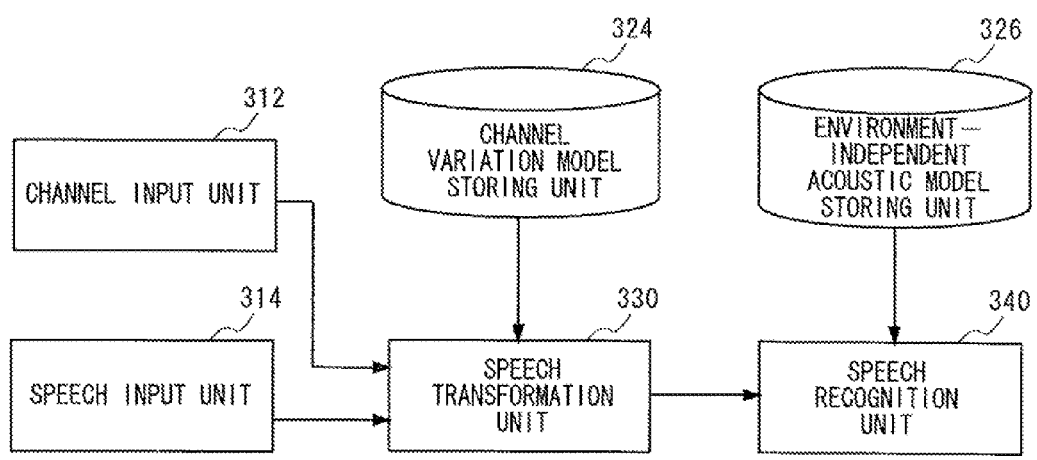
FIG. 6 is a view showing a speech recognition device according to a second embodiment of the invention.

FIG. 6 shows a speech recognition device 300 according to a second embodiment of the invention. The speech recognition device 300 includes a channel input unit 312, a speech input unit 314, a channel variation model storing unit 324, an environment-independent acoustic model storing unit 326, a speech transformation unit 330, and a speech recognition unit 340.

The speech input unit 314 inputs speech data as a target of speech recognition to the speech transformation unit 330.

The channel input unit 312 inputs a label that indicates a channel through which the speech data that is input from the speech input unit 314 has passed. Note that the label input by the channel input unit 312 is data that indicates the type of channel, and it is not limited to a label but may be an arbitrary name or number as long as a model of each channel stored in the channel variation model storing unit 324 can be specified.

The channel variation model storing unit 324 is equivalent to the channel variation model storing unit 254 in the acoustic model learning device 200 shown in FIG. 5, and it stores the channel variation model that is obtained by the channel variation model learning unit 230. Specifically, with respect to each channel of the type C, the channel variation model storing unit 324 stores the parameters $v_j$ and $W_j$ in association with a label indicating the channel of that type.

The environment-independent acoustic model storing unit 326 is equivalent to the environment-independent acoustic model storing unit 256 in the acoustic model learning device 200 shown in FIG. 5, and it stores the environment-independent acoustic model that is obtained by the environment-independent acoustic model learning unit 240.

The speech transformation unit 330 performs transformation for removing the effect by a channel on the speech data that is input by the speech input unit 314. Specifically, the speech transformation unit 330 reads the parameters $v_j$ and $W_j$ which correspond to the label input by the channel input unit 312 from the channel variation model storing unit 324 and transforms the input speech data "$x_1, x_2, \ldots, x_T$" to "$y_1, y_2, \ldots y_T$" according to the following Expression (17).

[Expression 17]

$$y_t = W_j^{-1}(x_t - v_j) \quad (17)$$

As described earlier, as a result of passing though the channel of the type j, the speech data changes as shown in the following Expression (6) which is described earlier.

[Expression 6]

$$x_t = W_j y_t + v_j \quad (6)$$

As known from comparison between Expression (17) and Expression (6), the transformation performed by the speech transformation unit 330 is equivalent to inverse transform of the effect on a speech which is caused by the channel of the type j, which is shown in Expression (6). Specifically, by the transformation, the effect of the channel of the type j through which the speech data has passed that is input by the channel input unit 312 is removed from the speech data that is input by the speech input unit 314.

The speech transformation unit 330 outputs the speech data "$y_1, y_2, \ldots, y_T$" that is obtained by removing the effect of the channel to the speech recognition unit 340.

The speech recognition unit 340 reads an environment-independent acoustic model from the environment-independent acoustic model storing unit 326, and performs speech recognition on the speech data "$y_1, y_2, \ldots, y_T$" from the speech transformation unit 330 by a known speech recognition method with use of a dictionary, a language model, a grammatical rule or the like, which is not shown, and outputs a character string as a result.

Figure 7:
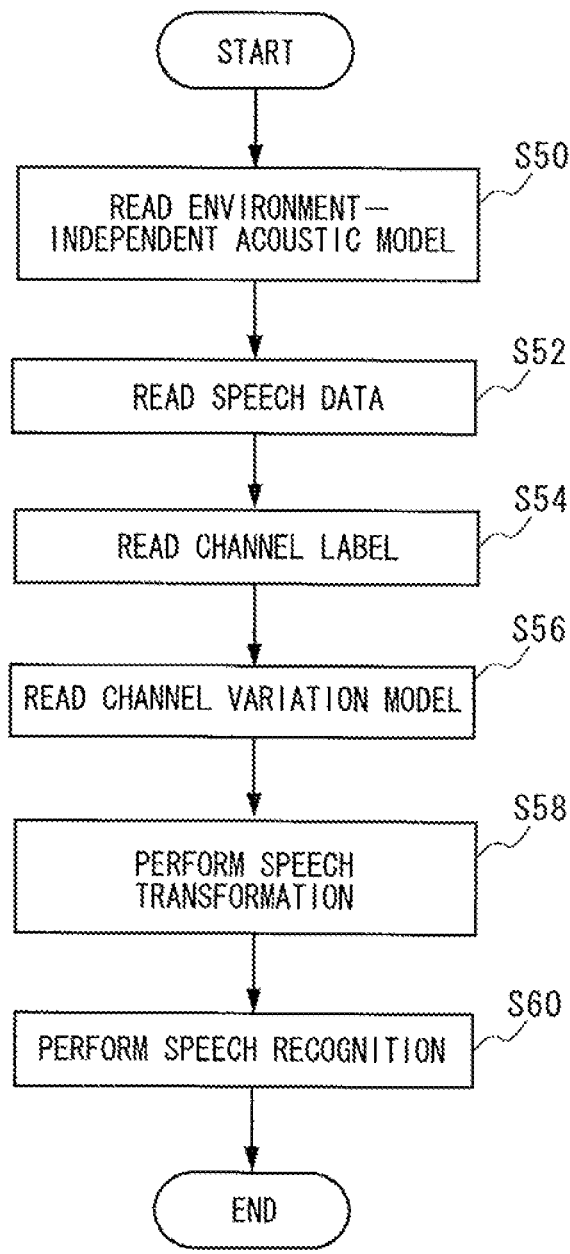
FIG. 7 is a flowchart showing a flow of a process in the speech recognition device shown in FIG. 6.

FIG. 7 is a flowchart showing a flow of a process of the speech recognition device 300 shown in FIG. 6. For speech recognition, the speech recognition unit 340 reads an environment-independent acoustic model from the environment-independent acoustic model storing unit 326 (S50). Note that the processing of Step S50 may be executed at any time before the environment-independent acoustic model storing unit 326 starts speech recognition.

The speech transformation unit 330 reads speech data from the speech input unit 314 and further reads a channel label that indicates a channel through which speech of the speech data has passed from the channel input unit 312 (S52, S54). Then, the speech transformation unit 330 reads parameters of a channel variation model which correspond to the channel label that is read from the channel input unit 312 from the channel variation model storing unit 324, performs speech transformation of the speech data that is read from the speech input unit 314 and thereby removes the effect of the channel (S58).

Finally, the speech recognition unit 340 performs speech recognition on the speech data from which the effect of the channel has been removed by the speech transformation unit 330 and thereby obtains a character string (S60).

According to the speech recognition device 300 of this embodiment, because the channel variation model extracts only the variation component due to the acoustic environment of a channel, it is possible to perform speech recognition of the speech data as a target of recognition after removing the effect of the channel and thereby increase the accuracy of speech recognition.

Note that, although the effect of the channel is removed by executing affine transformation on speech data by the speech transformation unit 330 in this embodiment, the same advantage can be obtained by executing equivalent transformation on an environment-independent acoustic model rather than the transformation on speech data, as is often performed in the field of speaker adaptation technology of an acoustic model.

It should be noted that the speech recognition device 300 is an example in which a variation model of a channel which is obtained by the acoustic model learning technique according to the present invention is applied to speech recognition. A variation model of a speaker which is obtained by the acoustic model learning technique according to the present invention may be applied to a speed input device or the like as a matter of course. In this case also, because the speaker variation model extracts only the variation component due to the acoustic environment of a speaker, it is possible to perform speech recognition of the speech data as a target of recognition after removing the effect of the speaker, which is highly accurate.

Third Embodiment

Figure 8:
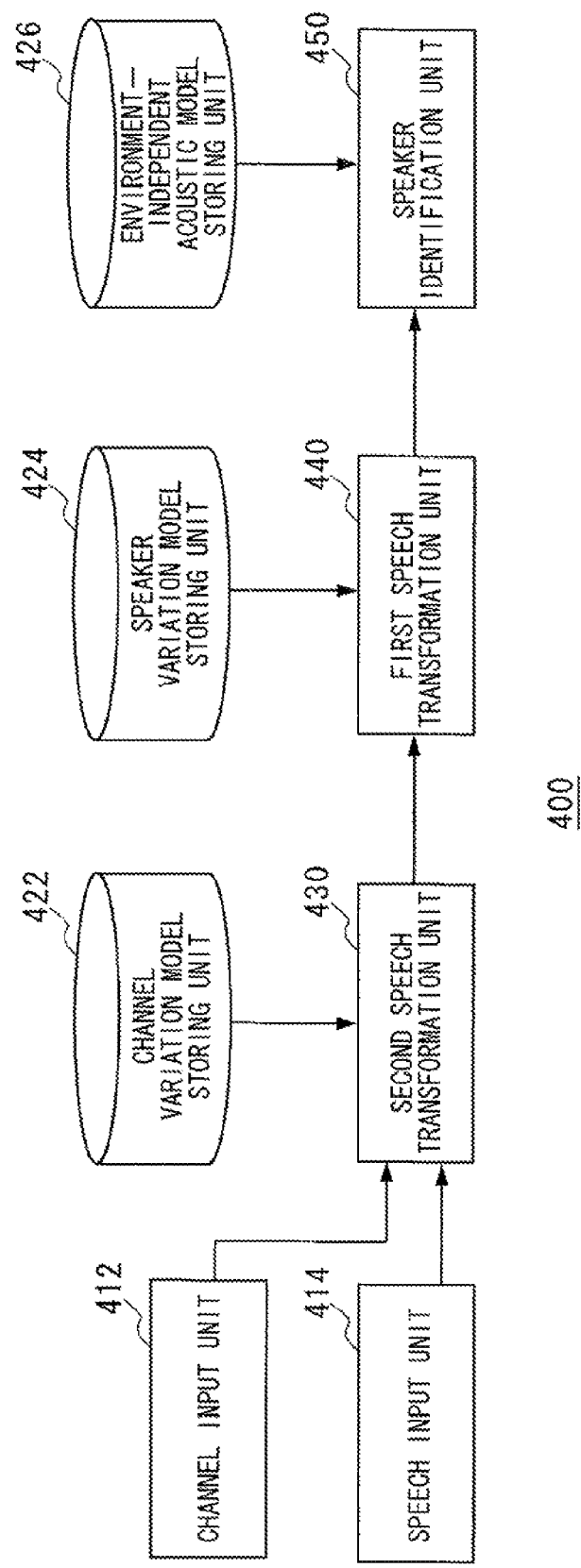
FIG. 8 is a view showing a speech recognition device according to a third embodiment of the invention.

FIG. 8 shows a speech recognition device 400 according to a third embodiment of the invention. The speech recognition device 400 identifies a speaker of an input speech, and it includes a channel input unit 412, a speech input unit 414, a speaker variation model storing unit 424, an environment-independent acoustic model storing unit 426, a channel variation model storing unit 422, a second speech transformation unit 430, a first speech transformation unit 440, and a speaker identification unit 450.

The channel input unit 412, the speech input unit 414, the channel variation model storing unit 422, the environment-independent acoustic model storing unit 426, and the second speech transformation unit 430 have the similar function and configuration as the channel input unit 312, the speech input unit 314, the channel variation model storing unit 324, the environment-independent acoustic model storing unit 326, and the speech transformation unit 330, respectively, and explanation thereof is omitted.

The speaker variation model storing unit 424 is equivalent to the speaker variation model storing unit 252 in the acoustic model learning device 200 shown in FIG. 5, and stores the speaker variation model that is obtained by the speaker variation model learning unit 220. Specifically, the speaker variation model storing unit 424 stores a parameter set "$V_i, \lambda_i$" with respect to each of N number of speakers.

In the speech recognition device 400, speech data from which the effect of a channel has been removed by the second speech transformation unit 430 is output to the first speech transformation unit 440.

The first speech transformation unit 440 reads the parameter set "$V_i, \lambda_i$" corresponding to each of the N number of speakers from the speaker variation model storing unit 424, performs transformation shown in the following Expression (18) by using each parameter set and thereby acquires the N number of speech data "$z_{1,1}, z_{1,2}, \ldots, z_{1,T}$", "$z_{2,1}, z_{2,2}, \ldots, z_{2,T}$", \ldots, "$z_{N,1}, z_{N,2}, \ldots, z_{N,T}$".

[Expression 18]

$$z_t = V_i^{-1}(y_t - \lambda_i) \quad (18)$$

As described earlier, as a result of speech production by a speaker of the type i, the speech data changes as shown in the following Expression (5) which is described earlier.

[Expression 5]

$$y_t = V_i z_t + \lambda_i \quad (5)$$

As known from comparison between Expression (18) and Expression (5), the transformation performed by the first speech transformation unit 440 is equivalent to inverse transform of the effect on a speech which is caused by the speaker of the type i, which is shown in Expression (5). Specifically, if the speech data input by the speech input unit 314 is uttered by the speaker i, the effect by the speaker i is removed from the speech data by the transformation.

The speaker identification unit 450 calculates the similarities $S_1, S_2, \ldots S_N$ with the model stored in the environment-independent acoustic model storing unit 426 with respect to each of the speech data "$z_{i,1}, z_{i,2}, \ldots, z_{i,T}$" obtained by the first speech transformation unit 440. Then, the speaker identification unit 450 outputs the number i with the highest similarity among the calculated similarities. The speaker of the speech data that is input from the speech input unit 414 is thereby recognized.

Note that the calculation of the similarities $S_i$ by the speaker identification unit 450 can be made by the following Expression (19), for example.

[Expression 19]

$$S_i = \prod_{t=1}^{T} \sum_{k=1}^{M} c_k f(z_{i,t} | \mu_k, \Sigma_k) \quad (19)$$

Alternatively, the following Expression (20) in logarithm may be used.

[Expression 20]

$$S_i = \sum_{t=1}^{T} \log \sum_{k=1}^{M} c_k f(z_{i,t} | \mu_k, \Sigma_k) \quad (20)$$

Figure 9:
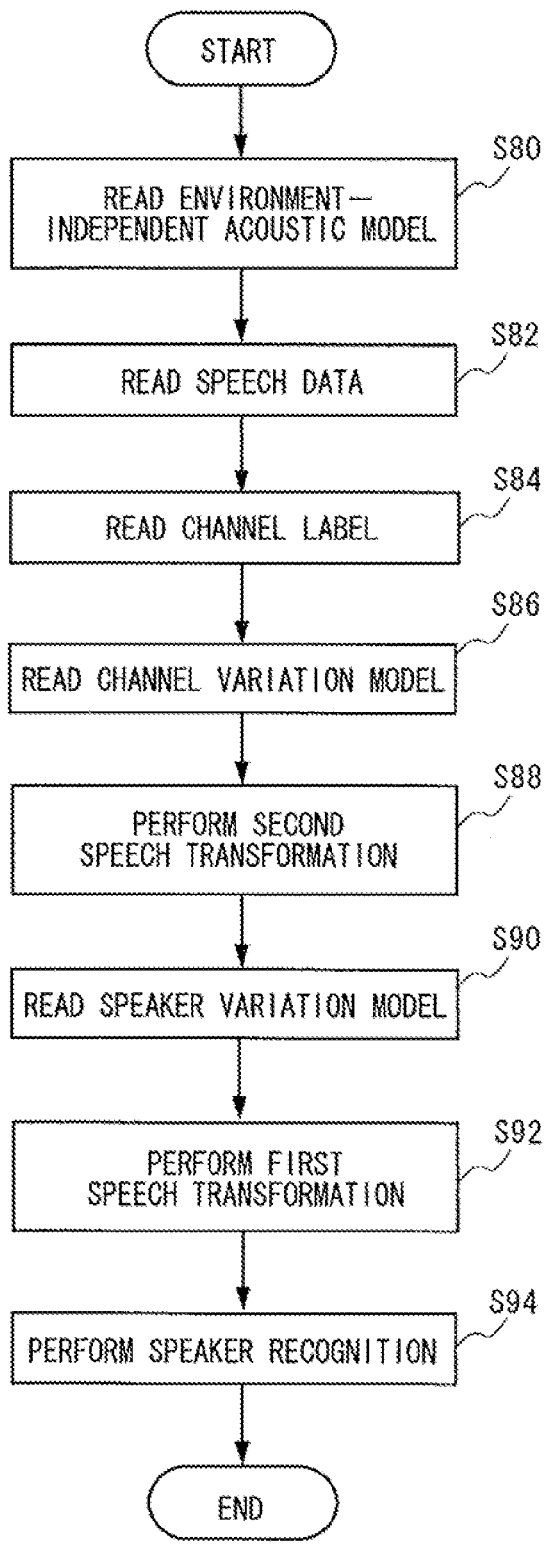
FIG. 9 is a flowchart showing a flow of a process in the speech recognition device shown in FIG. 8.
Figures 10, 11:
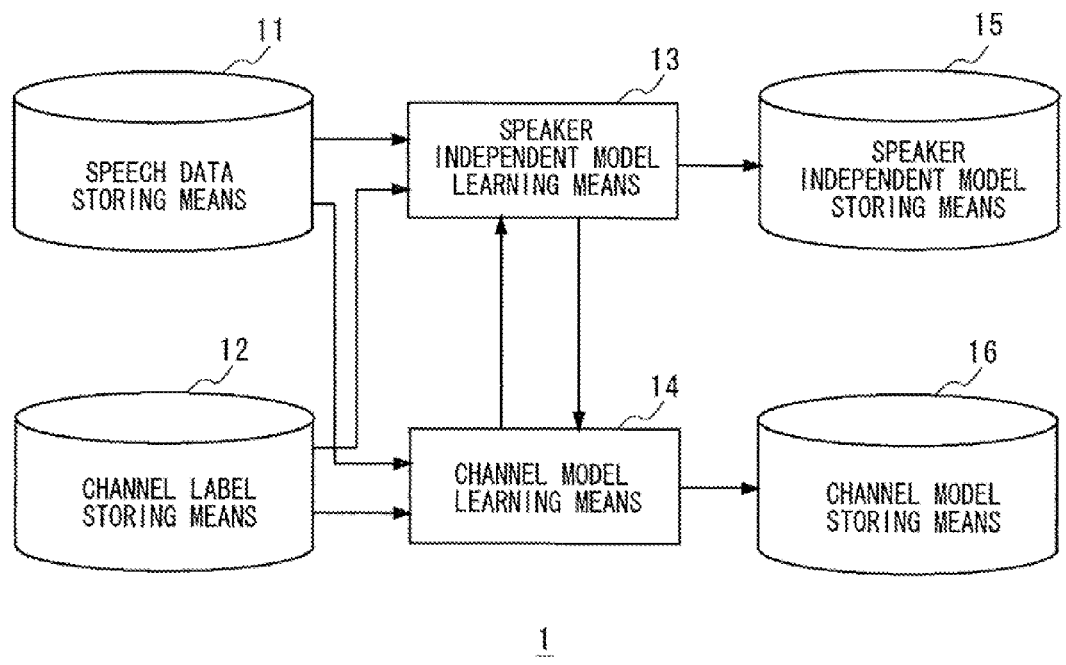
FIG. 10 is a schematic view of an acoustic model learning device to explain an acoustic model learning method according to prior art.
FIG. 11 is a view showing an example of sample speech data (first example)

FIG. 9 is a flowchart showing a flow of a process of the speech recognition device 400 shown in FIG. 8. The processing of Steps S80 to S88 is the same as the processing of Steps S50 to S58 in the speech recognition device 300 shown in FIG. 7, and detailed explanation thereof is omitted. In Step S90, the first speech transformation unit 440 reads all parameters of the speaker variation model stored in the speaker variation model storing unit 424, and, assuming that speakers are from a speaker i to a speaker N, executes first speech transformation that removes the effect of the speaker on the speech data from the second speech transformation unit 430 and thereby obtains the N number of speech data (S92). The speaker identification unit 450 calculates the similarities Si (i=1 to N) between the N number of speech data obtained by the first speech transformation unit 440 in Step S92 and the environment-independent acoustic model and obtains i corresponding to the speech data with the highest similarity, thereby obtaining a recognition result that the speech input from the speech input unit 414 is uttered by the speaker i (S94).

According to the speech recognition device 400 of this embodiment, recognition of a speaker is made after removing the effect of the channel on the speech data by the second speech transformation unit 430, and it is thus possible to increase the recognition accuracy.

Although the present invention is described above with reference to the embodiments (and modes for the invention), the present invention is not limited to the above-described embodiments (and modes for the invention). Various changes and modifications as would be obvious to one skilled in the art may be made to the configuration and the details of the present invention without departing from the scope of the invention.

For example, a program that contains descriptions of the procedure of the acoustic model learning process or the speech recognition process according to each of the embodiments described above may be loaded into a computer to cause the computer to operate as the acoustic model learning device or the speech recognition device according to each of the embodiments described above. In this case, a memory device of a computer, such as a hard disk, may be used as a storing unit that stores each model.

INDUSTRIAL APPLICABILITY

The present invention may be applied to a learning technique for constructing an acoustic model.

The invention claimed is:

1. An acoustic model learning device comprising:
a first variation model learning unit that estimates a parameter defining a first variation model indicating a variation in a speech for each type of a first environment factor by using a plurality of sample speech data acquired for each combination of one of a plurality of types of the first environment factor and one of plurality of types of a second environment factor, the first environment factor being one of a plurality of environment factors that change and thereby cause a variation in a speech, and the second environment factor being another of the plurality of environment factors;
a second variation model learning unit that, using the plurality of sample speech data, with respect to each type of the second environment factor, estimates a parameter defining a second variation model indicating a variation in a speech; and
an environment-independent acoustic model learning unit that, using the plurality of sample speech data, estimates a parameter defining an environment-independent acoustic model not specified as any type of the first environment factor and the second environment factor, wherein
each of the learning units estimates each parameter in such a way that an integrated degree of fitness obtained by integrating a degree of fitness of the first variation model to the sample speech data, a degree of fitness of the second variation model to the sample speech data, and a degree of fitness of the environment-independent acoustic model to the sample speech data becomes the maximum,
wherein the first variation model and the second variation model are each defined by a two-stage affine transformation.

2. The acoustic model learning device according to claim 1, wherein each of the learning units uses a probability that the sample speech data is observed, represented by the parameters of the first variation model, the second variation model and the environment-independent acoustic model, as the integrated degree of fitness.

3. The acoustic model learning device according to claim 2, wherein each of the learning units estimates a parameter by using an iterative method based on any one of a maximum likelihood estimation method, a maximum a posteriori estimation method, and a Bayes estimation method.

4. The acoustic model learning device according to claim 3, wherein the environment-independent acoustic model is a Gaussian mixture model or a hidden Markov model.

5. The acoustic model learning device according to claim 1, wherein the environment-independent acoustic model is a Gaussian mixture model or a hidden Markov model.

6. The acoustic model learning device according to claim 1, wherein each of the learning units estimates a parameter by using an iterative method based on any one of a maximum likelihood estimation method, a maximum a posteriori estimation method, and a Bayes estimation method.

7. The acoustic model learning device according to claim 6, wherein the environment-independent acoustic model is a Gaussian mixture model or a hidden Markov model.

8. The acoustic model learning device according to claim 1, wherein the environment-independent acoustic model is a Gaussian mixture model or a hidden Markov model.

9. A speech recognition device comprising:
a speech transformation unit that performs, on speech data as a recognition target acquired through the first environment factor of a given type, inverse transform of the variation indicated by the first variation model corresponding to the given type among first variation models obtained by the acoustic model learning device according to one of claim 1, wherein
speech recognition is performed on speech data obtained by the speech transformation unit.

10. A speech recognition device comprising:
a speech transformation unit that performs, on speech data as a recognition target acquired through the second environment factor of a given type, inverse transform of the variation indicated by the second variation model corresponding to the given type among second variation models obtained by the acoustic model learning device according to one of claim 1, wherein
speech recognition is performed on speech data obtained by the speech transformation unit.

11. An acoustic environment recognition device comprising:
a second speech transformation unit that performs, on speech data as a recognition target acquired through the second environment factor of a given type, inverse transform of the variation indicated by the second variation model corresponding to the given type among second variation models obtained by the acoustic model learning device according to one of claim 1;
a first speech transformation unit that sequentially performs, on speech data obtained by the second speech transformation unit, inverse transform of the variation indicated by each of first variation models obtained by the acoustic model learning device according to one of claim 1 and obtains a plurality of speech data; and
an identification unit that identifies a type of the first environment factor through which the speech data as a recognition target has passed by using the plurality of speech data obtained by the first speech transformation unit and the environment-independent acoustic model obtained by the acoustic model learning device according to one of claim 1.

12. The acoustic environment recognition device according to claim 11, wherein the first environment factor is a speaker, and the second environment factor is a transmission channel.

13. An acoustic model learning method comprising:
a first acoustic model learning step that estimates a parameter defining a first variation model indicating a variation in a speech for each type of a first environment factor by using a plurality of sample speech data acquired for each combination of one of a plurality of types of the first environment factor and one of plurality of types of a second environment factor, the first environment factor being one of a plurality of environment factors that change and thereby cause a variation in a speech, and the second environment factor being another of the plurality of environment factors;
a second variation model learning step that, using the plurality of sample speech data, with respect to each type of the second environment factor, estimates a parameter defining a second variation model indicating a variation in a speech; and
an environment-independent acoustic model learning step that, using the plurality of sample speech data, estimates a parameter defining an environment-independent acoustic model not specified as any type of the first environment factor and the second environment factor, wherein each of the acoustic model learning steps estimates each parameter in such a way that an integrated degree of fitness obtained by integrating a degree of fitness of the first variation model to the sample speech data, a degree of fitness of the second variation model to the sample speech data, and a degree of fitness of the environment-independent acoustic model to the sample speech data becomes the maximum, wherein the first variation model and the second variation model are each defined by a two-stage affine transformation.

14. An acoustic model learning method according to claim 13, wherein each of the acoustic model learning steps uses a probability that the sample speech data is observed, represented by the parameters of the first variation model, the second variation model and the environment-independent acoustic model, as the integrated degree of fitness.

15. A non-transitory computer readable medium that records a program causing a computer to execute a process comprising:

a first acoustic model learning step that estimates a parameter defining a first variation model indicating a variation in a speech for each type of a first environment factor by using a plurality of sample speech data acquired for each combination of one of a plurality of types of the first environment factor and one of plurality of types of a second environment factor, the first environment factor being one of a plurality of environment factors that change and thereby cause a variation in a speech, and the second environment factor being another of the plurality of environment factors;

a second variation model learning step that, using the plurality of sample speech data, with respect to each type of the second environment factor, estimates a parameter defining a second variation model indicating a variation in a speech; and an environment-independent acoustic model learning step that, using the plurality of sample speech data, estimates a parameter defining an environment-independent acoustic model not specified as any type of the first environment factor and the second environment factor, wherein each of the acoustic model learning steps estimates each parameter in such a way that an integrated degree of fitness obtained by integrating a degree of fitness of the first variation model to the sample speech data, a degree of fitness of the second variation model to the sample speech data, and a degree of fitness of the environment-independent acoustic model to the sample speech data becomes the maximum, wherein the first variation model and the second variation model are each defined by a two-stage affine transformation.

16. The non-transitory computer readable medium according to claim 9, wherein each of the acoustic model learning steps uses a probability that the sample speech data is observed, represented by the parameters of the first variation model, the second variation model and the environment-independent acoustic model, as the integrated degree of fitness.

17. A speech recognition device comprising:

a speech transformation unit that performs, on speech data as a recognition target acquired through the first environment factor of a given type, inverse transform of the variation indicated by the first variation model corresponding to the given type among first variation models obtained by the acoustic model learning device according to claim 2, wherein speech recognition is performed on speech data obtained by the speech transformation unit.

18. A speech recognition device comprising:

a speech transformation unit that performs, on speech data as a recognition target acquired through the second environment factor of a given type, inverse transform of the variation indicated by the second variation model corresponding to the given type among second variation models obtained by the acoustic model learning device according to claim 2, wherein speech recognition is performed on speech data obtained by the speech transformation unit.

19. An acoustic environment recognition device comprising:

a second speech transformation unit that performs, on speech data as a recognition target acquired through the second environment factor of a given type, inverse transform of the variation indicated by the second variation model corresponding to the given type among second variation models obtained by the acoustic model learning device according to claim 2;

a first speech transformation unit that sequentially performs, on speech data obtained by the second speech transformation unit, inverse transform of the variation indicated by each of first variation models obtained by the acoustic model learning device according to claim 2 and obtains a plurality of speech data; and an identification unit that identifies a type of the first environment factor through which the speech data as a recognition target has passed by using the plurality of speech data obtained by the first speech transformation unit and the environment-independent acoustic model obtained by the acoustic model learning device according to claim 2.

20. The acoustic environment recognition device according to claim 19, wherein the first is a speaker, and the second is a transmission channel.

* * * * *